March 5, 1935.  J. EDWARDES  1,993,212

MANUFACTURE OF RUBBER GOODS FROM RUBBER LATEX

Filed Aug. 24, 1933

Inventor
John Edwardes
by Wright, Brown, Quinby & Ray
attys.

Patented Mar. 5, 1935

1,993,212

UNITED STATES PATENT OFFICE 1,993,212

MANUFACTURE OF RUBBER GOODS FROM RUBBER LATEX

John Edwardes, Melrose, Mass., assignor to Heveatex Corporation, Melrose, Mass., a corporation of Massachusetts Application August 24, 1933, Serial No. 686,564

18 Claims. (Cl. 18—58)

A recently developed method of making rubber goods from rubber latex devolves about the coating of the forms or molds on which the goods are made with a desiccating material which is incapable of effecting a substantial coagulation of the latex but which is nevertheless capable of causing a deposition of rubber by exercising a desiccating or water-absorbing action on the latex brought in contact therewith.

I have found that such a method may be practiced to great advantage when the forms or molds are made of pulp, paper, cardboard, or similar fibrous material of the appropriate rigidity. Such molds, although most inexpensive to make, could not heretofore be put to successful use for the reason that the rubber deposited thereon from latex tended to stick to the fibers and, when removed, to carry therewith fibers or mold fragments. The coating of such molds with desiccating material in accordance with my invention not only promotes the deposition of rubber from the latex onto such molds, but also enables the removal of the dried and, if desired, vulcanized rubber in an intact, clean condition from the molds.

I have further found that irrespective of the material of which the molds are made and irrespective of whether the molds are porous or substantially impermeable, it is distinctly advantageous to prepare an aqueous coating composition for the molds containing not only a desiccating or dehydrating material of the character of colloidal clay, but also a viscous binding material in the nature of a water-swollen gel, which, too, is incapable of effecting a substantial coagulation of the latex, but is capable of setting or drying to a smooth, water-absorbing condition. Such a viscous or gelatinous binding material of the class described can lend to the coating the qualities of smoothness, uniformity, and integrity desired therein. Inasmuch as such binding material can be used in the aqueous coating composition in amount sufficient to raise its viscosity to a point, where it lends itself to smooth and uniform spreading onto the molds, there is little, if any, tendency for the colloidal clay or equivalent material to settle out. Accordingly, the composition can be kept at a uniform consistency and, when applied to the molds, does not tend to run down the sides of the molds and thus to eventuate in a coating of varying thickness. Any one or a mixture of such organic materials as karaya gum, locust bean gum, gum arabic, or soluble glue or casein, which can yield viscous or gelatinous media in admixture with water, are available for use in the aqueous coating composition.

On the accompanying drawing,—

Figures 1–4 inclusive depict the stages of manufacture of an article such as a toy balloon.

Figures 5–8 inclusive represent sections through the mold at the various stages.

Figure 1:
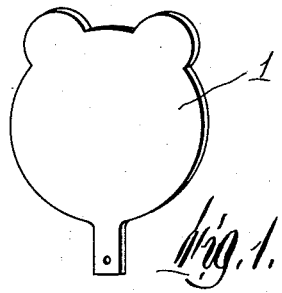
Figure 5:
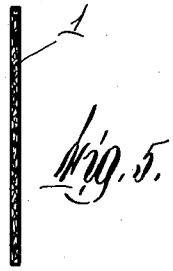
Figure 2:
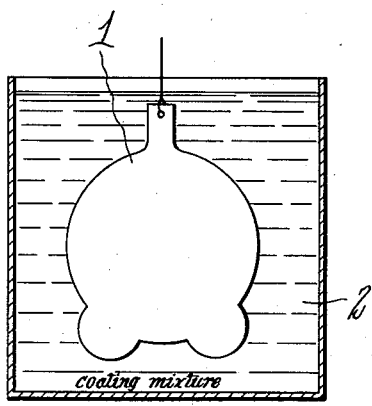
Figure 6:
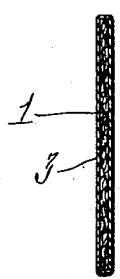
Figure 3:
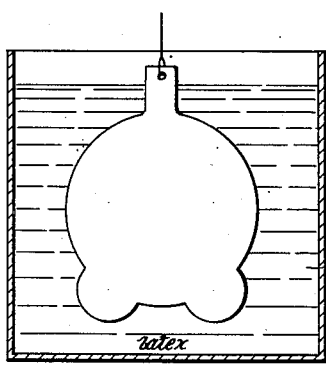
Figure 7:
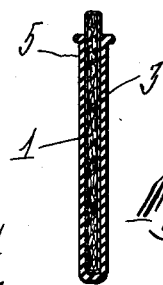
Figure 4:
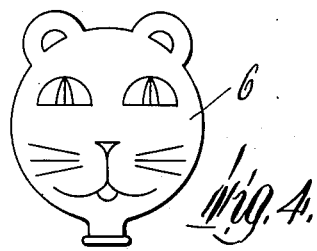
Figure 8:

A piece of blotting paper of suitable rigidity and porosity may be cut into a form or mold 1, which, as shown in Figure 1, has the shape of the silhouette of an animal's head, say, a cat's head. The paper mold may, as depicted in Figure 2, be dipped into a bath 2 of aqueous coating composition made up of an intimate mixture of, say, 28 parts of water, 4.8 parts of china clay, and 6 parts of a 3% solution of karaya gum. Upon removal from the bath, the mold and its coating 3 shown in Figure 6 may be dried. The mold may then be dipped, as indicated in Figure 3, into a bath 4 of suitable latex composition, preferably concentrated latex, wherein it may remain submersed for, say, a minute or more, to acquire the desired rubber deposit 5 shown in Figure 7 thereon. The mold and its deposit of rubber may then be dried. If desired, the rubber deposit may be vulcanized to the desired degree during or after the drying operation. The rubber deposit 5 may finally be removed from the mold, as illustrated in Figure 8, thereby producing a hollow rubber article 6 which can be inflated like the ordinary toy balloon. While on the form or after removal therefrom, the article 6 may be imprinted with the desired characteristics, for instance, with characters suggestive of a cat's face, as appear in Figure 7.

Figure 9:
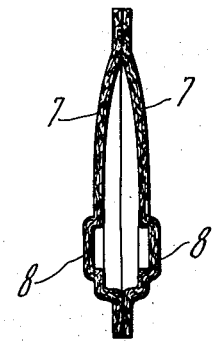
Figure 9 represents a section through a mold for an article such as a bathing cap.
Figure 10:
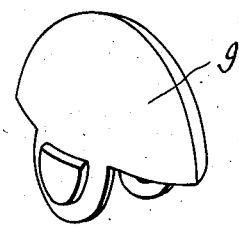
Figure 10 illustrates in perspective a bathing cap such as is producible on the mold.

Articles, such as bathing caps, may be similarly made on molds cut from the requisite shape from blotting or other suitable paper. The mold for a bathing cap shown in Figure 9 may, for instance, be made by cutting two similar forms 7 of the appropriate outline from blotting paper, embossing or pressing them to the desired surface contour or configuration, such as one including outwardly raised or relief portions 8 corresponding to the ears, and finally superposing the two forms in the proper relationship and uniting them at their contacting areas with glue or other suitable adhesives. Such a mold when put through the steps already described in connection with the mold shown in Figure 1 yields a rubber bathing cap 9 such as illustrated in Figure 10.

It is, of course, possible to make a wide variety of rubber articles by using, according to the principles of my invention, inexpensive molds such as can be died out or cut from blotting paper or similar fibrous sheet material. So, too, molds made by forming wet pulp or aqueous pulp suspensions to the desired shape and then drying the shaped pulp may serve in the same way as molds cut from blotting paper or similar fibrous sheet material.

When the molds or forms are made of substantially impermeable material, the aqueous coating composition may advantageously be made up in a way different from that already described in connection with a paper form. A wooden form, say, a toy-balloon form, may be coated with a composition made up of 5.5 parts of water, 5 parts of china clay, and 0.3 parts of locust bean gum. If desired, a colloidal clay, such an bentonite, may be used in lieu of china clay, in which case the composition should contain much more water in order to satisfy the water-absorbing capacity of the colloidal clay. Thus, the composition in such case may be one made up of 140 parts by weight of water, 13 parts of bentonite, and 0.3 parts of locust bean gum. This composition is one of sufficient fluidity to serve as a dipping medium into which the form may be dipped for acquiring a coating of the desired smoothness and uniformity. When the form is coated with either of the foregoing compositions and then dried as at room temperature, it will acquire a smooth, firm deposit of clay and binder of substantially uniform thickness thereon. The dried form can then be dipped into a bath of suitable latex composition, preferably concentrated latex, removed from the bath after a period of immersion of about a minute or more, dried, and the rubber deposit vulcanized, if desired. It is found that the finished balloon can be easily removed from the form.

There are various inert bodies of a hydrophilic nature which may be used for dressing or coating the molds according to my invention. These bodies, rather than being coagulants of latex, are inert chemically with respect to the latex and when added to latex as aqueous gels tend to stabilize or to protect it against coagulation. Yet, when a limited amount of latex is brought into contact with these bodies in dry condition, they may abstract and absorb sufficient water from the latex to cause a deposition of solid rubber from the latex much in the same way that the evaporation of water from latex leaves a solid rubber residue. This is evidently the condition realized when molds dressed or coated with desiccating materials such as I have described are dipped into latex, there being a removal of water from the limited amount of latex immediately next to the coatings sufficient to give rise to the deposition of rubber on the coatings. The colloidal clays, such as bentonite, wilkenite, and ardmorite, the more highly absorbent china clays, and similar pulverulent materials, such as fuller's earth, kieselguhr, etc., may be used to good advantage as the desiccating materials in the practice of my invention, as they are characterized by their high water-absorbing capacity and their substantial inertness with respect to rubber latex. These materials may be dusted onto the molds, but from the standpoint of arriving at a uniform coating of sensible thickness on the molds, it is preferable to prepare a smooth, aqueous slurry or paste of these materials, then to apply the paste onto the molds as a smooth, uniform coating, and to dry the coating. I intend to protect herein that phase of my invention which involves using a gelatinous material in the aqueous coating composition along with desiccating material no matter to what kind of mold the composition is applied. I do not, however, claim as my invention the broad principle of dressing or coating a mold with a desiccating material incapable of effecting a substantial coagulation of the latex excepting as it is applied to pulp, paper, cardboard, or similar molds, since this broad principle is the invention of James B. Crockett and is disclosed and claimed in his application Serial No. 686,569 filed August 24, 1933. Inasmuch as there is no strictly accurate term for molds of shaped pulp and those cut from paper, cardboard, and similar fibrous material, I shall for convenience of designation use the expression "pulp mold" in the appended claims in a comprehensive sense to include them all, particularly as pulp enters as raw material into all of them.

As already observed, the principles of the present invention may be availed of in the fabrication of a wide variety of dipped rubber goods, including bathing caps, gloves, nipples, toy figures, etc., which, while they are still on the forms, may be imprinted with any suitable characters and/or designs, as customarily. The principles of the present invention may be extended to the fabrication from rubber latex of sheet rubber goods on flat or figureless forms, for instance, on drums or belts. Thus, a drum of large diameter may be rotated at a slow rate of speed partially submerged in a bath of rubber latex. It may progressively receive on an unsubmerged portion of its periphery a uniform coating of an aqueous composition such as described and have the coating dried thereon as by heating the drum internally or by circulating a current of heated air past the coating, before the coating dips into the latex. The rubber deposit effected on the coating while it is submerged in the latex may be progressively dried and stripped from the drum periphery after it has issued from the latex bath, whereupon the drum periphery may be, if desired, washed and dried and again coated before it undergoes the next submersion in the latex. In a similar way, a belt traveling continuously and horizontally over guide rolls with its lower stretch passing through a bath of latex may be uniformly coated on a portion of its upper stretch with the aqueous composition and the coating dried before it makes contact with the latex, whereupon the rubber deposit delivered by the upper stretch of the belt may be dried and stripped from the belt preparatory to coating it anew with the aqueous composition.

It is again to be observed that my invention makes possible the use of molds made from a variety of materials, both porous and non-porous. It will, of course, be understood that the term "mold" or "form" is used herein, and in the appended claims, in its broad sense to mean not only figured molds for such articles as toy balloons, bathing caps, gloves, nipples, etc., but also figureless molds for flat or sheet rubber.

The rubber latex used in the dipping bath may be prepared or compounded in such a way as to comport with the characteristics desired in the finished articles. But the rubber latex used is preferably one concentrated to a super-normal solids content by any approved modern treatment. It may be a vulcanized latex or one containing vulcanizing and/or other compounding ingredients, e. g., sulphur, accelerators of vulcanization, fillers, pigments, or other colorants. Indeed, I am using the term "latex" in its comprehensive sense to mean not only the natural rubber-bearing serum, but also artificial aqueous dispersions of rubber partaking of the qualities of natural latex.

It is possible to depart in some respects from the examples hereinbefore given, wherein a desiccating action alone is relied upon to deposit the rubber onto the molds from the latex. In some cases, for example, mild coagulants, which by themselves or in the particular concentration used would not function effectively, may be commingled with the aqueous composition containing a desiccating material with which I coat or dress the molds. These may merely supplement the action of the desiccating material to bring about a deposition of rubber from latex onto the molds, the rubber-depositing action being largely the result of a desiccating rather than a coagulating action. In other cases, the molds may be heated internally as by hot water or other heating fluid or by electrical or other means to promote the deposition of the rubber from the latex even though the deposition may come about largely through the desiccating action of the coating on the molds. As already stressed, molds dressed or coated as hereinbefore described, permit an easy stripping of the finished rubber goods therefrom. It may, however, be advantageous to add to the aqueous dressing or coating composition pulverulent materials of the nature of aluminum flake, mica, talc, etc., for the purpose of increasing the ease with which the finished rubber goods are stripped from the molds.

The drying of the aqueous composition may be effected at elevated temperature, for instance, by heating the interior of the molds by circulating heated air past the coated molds, or in any other suitable way. The drying of the rubber deposited on the molds may be similarly effected.

I claim:—

1. A method of forming a rubber article from rubber latex, which comprises applying to a form of the desired shape a coating of a mixture of desiccating material incapable of effecting a substantial coagulation of the latex and a viscous binding material also incapable of effecting a substantial coagulation of the latex but capable of setting to a smooth, water-absorbing condition; allowing the coating to set; bringing the coated form into contact with an excess of latex to cause the water content of the latex adjacent to said coating to be desiccated thereby and simultaneously to cause the rubber of said desiccated latex to be deposited as a layer on said coating; drying the rubber deposit; and stripping it from the form.

2. A method of forming a rubber article from rubber latex, which comprises applying to a form of the desired shape a coating of a smooth, viscous, aqueous composition containing a pulverulent desiccating material incapable of effecting a substantial coagulation of the latex and a gelatinous material also incapable of effecting a substantial coagulation of the latex but capable of setting to a smooth, water-absorbing condition; allowing the coating to set; bringing the coated form into contact with an excess of latex to cause the water content of the latex adjacent to said coating to be desiccated thereby and simultaneously to cause the rubber of said desiccated latex to be deposited as a layer on said coating; drying the rubber deposit; and stripping it from the form.

3. A method of forming a rubber article from rubber latex, which comprises applying to a form of the desired shape a coating of smooth, viscous, aqueous composition containing colloidal clay and a water-swollen gel; drying the coated form; bringing the dried, coated form into contact with an excess of latex to cause the water content of the latex adjacent to said coating to be desiccated thereby and simultaneously to cause the rubber of said desiccated latex to be deposited as a layer on said coating; drying the rubber deposit; and stripping it from the form.

4. A method of forming a rubber article from rubber latex, which comprises applying to a pulp form of the desired shape a coating of desiccating material incapable of effecting a substantial coagulation of the latex, bringing said coated form into contact with an excess of latex to cause the water content of the latex adjacent to said coating to be desiccated thereby and simultaneously to cause the rubber of said desiccated latex to be deposited as a layer on said coating, drying the rubber deposit, and stripping it from the form.

5. A method of forming a rubber article from rubber latex, which comprises applying to a pulp form of the desired shape a coating of pulverulent desiccating material incapable of effecting a substantial coagulation of the latex, bringing said coated form into contact with an excess of latex to cause the water content of the latex adjacent to said coating to be desiccated thereby and simultaneously to cause the rubber of said desiccated latex to be deposited as a layer on said coating, drying the rubber deposit and stripping it from the form.

6. A method of forming a rubber article from rubber latex, which comprises applying to a pulp form of the desired shape a coating of colloidal clay, bringing said coated form into contact with an excess of latex to cause the water content of the latex adjacent to said coating to be desiccated thereby and simultaneously to cause the rubber of said desiccated latex to be deposited as a layer on said coating, drying the rubber deposit, and stripping it from the form.

7. A method of forming a rubber article from rubber latex, which comprises cutting a form of the desired shape from paper possessing the qualities of porosity and rigidity, applying to the form a coating of a mixture of desiccating material incapable of effecting a substantial coagulation of the latex and a viscous binding material also incapable of effecting a substantial coagulation of the latex but capable of setting to a smooth, water-absorbing condition; allowing the coating to set; bringing the coated form into contact with an excess of latex to cause the water content of the latex adjacent to said coating to be desiccated thereby and simultaneously to cause the rubber of said desiccated latex to be deposited as a layer on said coating; drying the rubber deposit; and stripping it from the form.

8. A method of forming a rubber article from rubber latex, which comprises cutting a form of the desired shape from paper possessing the qualities of porosity and rigidity, applying to the form a coating of a smooth, viscous, aqueous composition containing a pulverulent desiccating material incapable of effecting a substantial coagulation of the latex and a gelatinous material also incapable of effecting a substantial coagulation of the latex but capable of setting to a smooth, water-absorbing condition; allowing the coating to set; bringing the coated form into contact with an excess of latex to cause the water content of the latex adjacent to said coating to be desiccated thereby and simultaneously to cause the rubber of said desiccated latex to be deposited as a layer on said coating; drying the rubber deposit; and stripping it from the form.

9. A method of forming a rubber article from rubber latex, which comprises cutting a form of the desired shape from paper possessing the qualities of porosity and rigidity, applying to the form a coating of smooth, viscous, aqueous composition containing colloidal clay and a water-swollen gel; drying the coated form; bringing the dried, coated form into contact with an excess of latex to cause the water content of the latex adjacent to said coating to be desiccated thereby and simultaneously to cause the rubber of said desiccated latex to be deposited as a layer on said coating; drying the rubber deposit; and stripping it from the form.

10. A method of forming a rubber article from rubber latex, which comprises cutting a pair of similar forms of the desired shape from paper possessing the qualities of porosity and rigidity, embossing said forms with the same relief pattern, superposing and adhesively uniting the embossed forms at their contacting areas, applying to the resulting, built-up form a coating of a mixture of desiccating material incapable of effecting a substantial coagulation of the latex and a viscous binding material also incapable of effecting a substantial coagulation of the latex but capable of setting to a smooth, water-absorbing condition; allowing the coating to set; bringing the coated form into contact with an excess of latex to cause the water content of the latex adjacent to said coating to be desiccated thereby and simultaneously to cause the rubber of said desiccated latex to be deposited as a layer on said coating; drying the rubber deposit; and stripping it from the form.

11. A pulp mold designed especially for taking on a deposit of rubber from rubber latex, said mold being enveloped by a coating of desiccating material incapable of effecting a substantial coagulation of the latex.

12. A pulp mold designed especially for taking on a deposit of rubber from rubber latex, said mold being enveloped by a coating of pulverulent desiccating material.

13. A pulp mold designed especially for taking on a deposit of rubber from rubber latex, said mold being enveloped by a coating of colloidal clay.

14. A mold designed especially for taking on a deposit of rubber from rubber latex, said mold being enveloped by a dried mixture of desiccating material incapable of effecting a substantial coagulation of the latex and a viscous binding material also incapable of effecting a substantial coagulation of the latex but capable of drying to a smooth, water-absorbing condition.

15. A mold designed especially for taking on a deposit of rubber from rubber latex, said mold being enveloped by a substantially uniform, dried coating of a smooth, viscous, aqueous composition containing pulverulent desiccating material incapable of effecting a substantial coagulation of the latex and a gelatinous material also incapable of effecting a substantial coagulation of the latex but capable of setting to a smooth, water-absorbing condition.

16. A mold designed especially for taking on a deposit of rubber from rubber latex, said mold being enveloped by a substantially uniform, dried coating of a smooth, viscous, aqueous composition containing colloidal clay and a water-absorbent gel incapable of effecting a substantial coagulation of the latex but capable of setting to a smooth, water-absorbing condition.

17. A mold made up of a pair of similar paper forms adhesively united to each other in superposed relationship, said mold being enveloped by a coating of desiccating material incapable of effecting a substantial coagulation of rubber latex.

18. A mold made up of a pair of similar paper forms adhesively united to each other in superposed relationship and having similar characters occurring in relief therein, said mold being enveloped by a coating of pulverulent desiccating material incapable of effecting a substantial coagulation of rubber latex.

JOHN EDWARDES.